United States Patent

[11] 3,618,628

| [72] | Inventor | Manfred Krämer<br>Fellbach-Lindle, Germany |
|---|---|---|
| [21] | Appl. No. | 41,397 |
| [22] | Filed | May 28, 1970 |
| [45] | Patented | Nov. 9, 1971 |
| [73] | Assignee | Robert Bosch GmbH<br>Stuttgart, Germany |
| [32] | Priority | June 28, 1970 |
| [33] | | Germany |
| [31] | | P 19 32 996.5 |

[54] THROTTLING ARRANGEMENT FOR CONTROLLING THE FLOW FROM TWO OUTLETS
10 Claims, 2 Drawing Figs.

[52] U.S. Cl. .................................................. 137/101, 137/117
[51] Int. Cl. ............................................... G05d 11/03
[50] Field of Search ......................................... 137/101, 115, 116, 117, 118, 119

[56] References Cited
UNITED STATES PATENTS

| 2,643,664 | 6/1953 | Willett | 137/101 |
| 2,859,762 | 11/1958 | Banker | 137/101 |
| 2,995,141 | 8/1961 | Hipp | 137/101 |
| 3,033,221 | 5/1962 | Strader | 137/101 |
| 3,160,167 | 12/1964 | Martin | 137/101 |

*Primary Examiner*—Robert G. Nilson
*Attorney*—Michael S. Striker

ABSTRACT: A spring-biased regulating valve has a first regulating position directing fluid from a pump at a constant pressure to a first outlet, and directing excess fluid to a second outlet. The regulating valve is held in the first regulating position by fluid pressure in a regulating chamber to which fluid is supplied through a throttle from the first outlet. When the pressure in the first outlet rises above a desired constant value, a biased control valve responds to the pressure increase and relieves the pressure in the regulating chamber so that the regulating valve moves to a second regulating position in which all the fluid from the pump is supplied to the second outlet until the pressure in the first outlet has again its desired constant value. The consumer connected to the second outlet is not disturbed by interruption of the load on the first outlet, and different pressures are possible for the first and second outlets.

PATENTED NOV 9 1971

3,618,628

INVENTOR:
Manfred KRÄMER

By
his ATTORNEY

THROTTLING ARRANGEMENT FOR CONTROLLING THE FLOW FROM TWO OUTLETS

BACKGROUND OF THE INVENTION

The present invention relates to a valve arrangement of the type in which a first consumer receives a pressure fluid to a certain amount, while excess amounts are supplied to a second consumer outlet.

The DAS (German Pat.) No. 1,108,127 discloses a regulating valve arrangement in which a constant amount of pressure fluid is directed to a first consumer, and the excess amount of fluid is directed to a second consumer. When the constant flow of fluid to the first consumer is interrupted, the valve also interrupts the flow to the second consumer unless a pressure-limiting valve is provided in the constant pressure consumer outlet. The constant amount of fluid flowing through this valve constitutes a substantial loss.

The U.S. Pat. No. 2,573,563 discloses an arrangement with a source of pressure fluid and two consumer outlets, of which one is supplied with a constant amount of fluid at a reduced pressure. The regulating valve controls only the constant flow of fluid, and cannot direct excess fluid to a second consumer.

SUMMARY OF THE INVENTION

It is one object of the invention to overcome the disadvantages of the prior art, and to provide an apparatus for supplying pressure fluid to a consumer requiring a constant amount, and to a second consumer receiving the excess amount of fluid supplied from a pump.

It is another object of the invention to provide such an arrangement with throttling means so that the consumer of the excess fluid is not disturbed when the flow to the constant consumer is interrupted.

Another object of the invention is to obtain different fluid pressures for two consumers, one of which receives a constant amount of fluid, and the other an excess amount of fluid.

With these objects in view, the present invention provides a pressure-responsive valve between a regulating chamber of a regulating valve, which responds to the pressure in the regulating chamber which is provided with pressure fluid from the first consumer outlet through a throttling means. In this manner, it is possible to operate a regulating valve with a constant and excess flow delivery, as a pressure-limiting valve when the constant flow is interrupted, while almost the entire pump flow is directed to the second outlet for the excess fluid. This results in a substantial increase of the efficiency of the apparatus.

In one embodiment of the invention, the losses due to leakage of fluid through the pressure-responsive valve are particularly small, or completely eliminated, while in another embodiment of the invention different pressures can be obtained for the constant fluid consumer and excess fluid consumer.

An embodiment of the invention comprises supply means for a pressure fluid; flow-regulating valve means having an inlet receiving pressure fluid from the supply means, first and second outlets, a first regulating chamber, biasing means in the first regulating chamber for urging the regulating valve means in one direction to a first regulating position connecting the inlet with the first and second outlets and a second regulating chamber communicating with the first outlet and receiving fluid therefrom for urging the regulating valve means in the opposite direction to a second regulating position connecting only the second outlet with the inlet; and control means including return outlet means communicating with the supply means for returning fluid to the same, throttling means between the first outlet and the first regulating chamber, and a pressure-responsive valve means between the first regulating chamber and the return outlet means, and being biased to a first control position disconnecting the first regulating chamber from the return outlet means so that fluid from the first outlet increases the pressure in the first regulating chamber through the throttling means whereby the regulating valve means is held in the first regulating position.

The pressure-responsive valve means is moved to a second control position when the pressure in the first outlet and in the first regulating chamber exceeds a predetermined value. The pressure-responsive valve means in the second control position, connect the first regulating chamber with the return outlet means so that the pressure fluid in the second regulating chamber moves the regulating valve means to a second regulating position.

The biased pressure-responsive valve means return to the first control position when the pressure in the first outlet and thereby in the first regulating chamber drops so that the first regulating chamber is disconnected from the return outlet means and the pressure therein increases so that the regulating valve means is moved to the first regulating position.

In one embodiment of the invention, the throttling means is a constriction in a conduit connecting the first outlet with the first regulating chamber. In another embodiment of the invention the throttling means is variable, and is connected with the pressure-responsive valve means for movement therewith so that the throttling flow cross section of the throttling means is reduced when the free flow cross section of the pressure-responsive valve means between the first regulating chamber and the return outlet means increases during movement of the same from the first to the second control position.

In another embodiment of the invention, the pressure-responsive valve is a check valve communicating with the first regulating chamber and connected with the return outlet means.

In another embodiment of the invention, the pressure-responsive valve includes a control slide forming the throttling means with portions of the cylinder in which the slide moves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
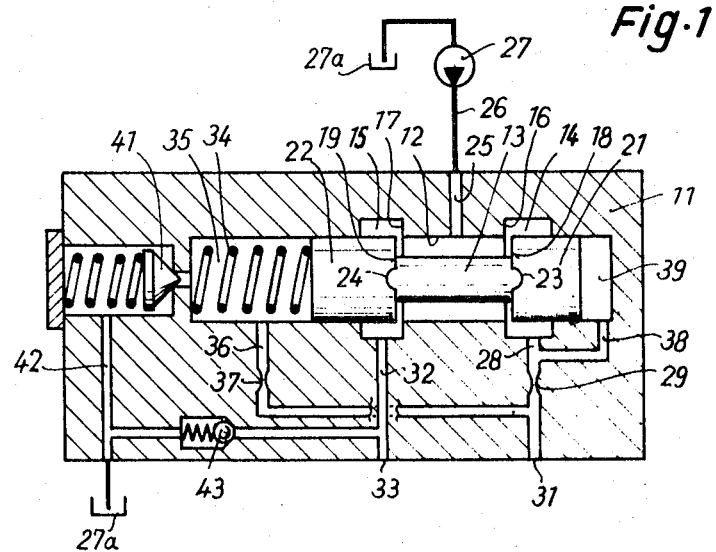
FIG. 1 is a schematic sectional view illustrating a first embodiment of the invention with a constant throttle.

The flow-regulating valve shown in FIG. 1 has a housing or body 11 in which a bore constituting a regulating valve cylinder 12 is provided for guiding the regulating valve slide 13 in a sealed condition between two regulating positions. The regulating valve cylinder 12 has annular recesses or chambers 14 and 15 provided with annular control edges 16 and 17 cooperating with control edges 18 and 19 on piston portions 21 and 22 of regulating slide 13. The control edges 18 and 19 of regulating slide 13 are provided with recesses 23, 24 for obtaining a fine regulation.

A pump 27 is connected by a conduit 26 to the inlet 25 which communicates with a central portion of regulating valve cylinder located between annular chambers 14 and 15. Pump 27 sucks fluid from container means 27a, which are also shown in the lower left corner of FIG. 1 in a schematic manner.

Chamber 14 is connected by a channel portion 28 with a first outlet 31 with which a consumer apparatus requiring a constant amount of fluid is connected, while the other chamber 15 is connected by a conduit 32 with a second outlet 33 to which a consumer receiving the excess fluid is connected. Under certain operational conditions, which will be explained hereinafter, all the fluid pumped by pump 27 is supplied to the second consumer through the second outlet 33.

The piston portion 22 forms in the regulating valve cylinder 12 a first regulating chamber 35, and piston portion 21 forms a second regulating chamber 39 at the other end of regulating valve slide 13. A spring 34 is disposed in the first regulating chamber 35 and biases the regulating valve slide 13 to the right as viewed in FIG. 1 to reduce the volume of the second regulating chamber 39.

The first outlet 31 is connected at a point downstream of throttle 29 with a conduit 36 which opens in the regulating chamber 35, and has a constricted throttle portion 37. Conduit 38 connects conduit 28 upstream of throttle 29 with the second regulating chamber 39.

A pressure-responsive valve member 41 is biased by a spring to engage a seat communicating with the first regulating chamber 35, and when the pressure in the same exceeds a certain value, pressure-responsive valve 41 opens and regulating chamber 35 is connected to a return conduit which discharges into container means 27a from which pump 27 sucks fluid. Pressure-responsive valve 41 limits the pressure in regulating chamber 35.

Another pressure-responsive and pressure-limiting valve 43 is provided in a conduit which connects the second outlet 33 with the return outlet 42. Conduit 36 is shown in FIG. 1 interrupted in order to indicate that it crosses the second outlet 32, 33 at a distance.

The throttling arrangement illustrated in FIG. 1 operates as follows:

The flow-regulating valve means including regulating valve slide 13 and throttle 29, supplies the fluid from pump 27 to the consumer which is connected to the first outlet 31 so that a constant amount of fluid flows to the consumer, while excess fluid pumped by the pump 27 is directed through the second outlet to a second consumer. This function of the regulating valve is carried out in a normal first regulating position in which regulating valve slide 13 is urged by spring 34 and by the pressure fluid in the regulating chamber 35 to the right to the illustrated position in which the control edges 16 to 19 permit the flow from inlet 25 through the annular chambers 15 and 14 to first and second outlets 31 and 33. When the constant flow through outlet 31 is interrupted, so that the pressure in outlet 31 rises, the pressure also rises in the first regulating chamber 35 so that the pressure-responsive valve 41 is moved away from its valve seat against the action of its spring so that pressure fluid can flow from the first regulating chamber 35 through the valve bore of valve 41 into the return outlet 42 from which the fluid is discharged into container means 27a from where it is sucked by pump 27 and again supplied to the inlet 25 and regulating valve cylinder 12. Since the pressure in the regulating chamber 35 drops, a pressure differential is produced on opposite sides of throttle 37 and the high pressure in regulating chamber 39 overcomes the force of spring 34 so that the valve slide 13 is moved to a second regulating position in which piston portion 21 is moved to the left and the control edges 16 and 18 cooperate to interrupt flow of fluid from inlet 25 to outlet 28, 31. At the same time, control edges 17 and 19 move farther apart, and the fluid is delivered from inlet 25 to the second outlet 32. Almost the entire amount of fluid pumped by pump 27 flows now into the second outlet 33, except for a small loss flow through the pressure-responsive valve 41 and return outlet 42. This leakage flow is held to a minimum by the throttle 37.

If the pressure in the second outlet 33 is higher than the pressure in the first outlet 31, control edge 18 with its recess 23 assumes such a position that the pressure fluid flowing to the first outlet 31 is only throttled, which has an influence on the pressure in the regulating chamber 35. If the pressure in the second outlet 33 is less than the pressure required at the first outlet 31, the control edge 19 throttles the flow to the second outlet 33 to such an extent that the pressure in inlet 25 is substantially equal to the pressure at the first outlet 31.

Consequently, the flow-regulating valve 12, 13 has the effect of, and operates in the manner of a pressure-limiting valve. The pressure for the consumer connected with the second outlet 33, can be limited by the second pressure-responsive valve 43 whose spring is selected so that valve 43 responds to a pressure which is equal or greater than the pressure to which pressure-responsive valve 41 responds.

If a constant flow is again required at the first outlet 31, and when the pressure in regulating chamber 35 drops below the pressure required for operating pressure-responsive valve 41, the pressure-responsive valve 41 closes, the pressure differential on opposite sides of throttle 37 in conduit 36 is equalized, and the pressure-regulating valve means performs only the function of flow regulation. The apparatus described with reference to FIG. 1 is capable of supplying at the same time pressure fluid to a consumer of a constant amount of fluid through outlet 31, and the remaining fluid supplied by pump 27 to another consumer through outlet 33, while the pressure of the fluid flowing through outlet 33 can be selected to be higher than the pressure of the fluid through outlet 31. For this purpose, the pressure-responsive valve 43 is adjusted to a pressure valve which is above the pressure to which the pressure-responsive valve 41 is adjusted.

Figure 2:
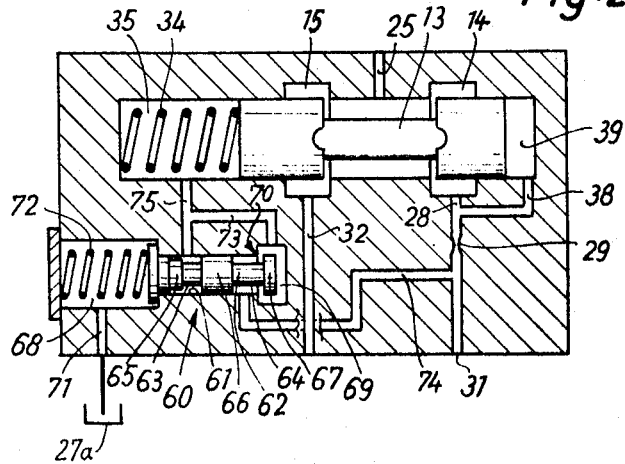
FIG. 2 is a schematic sectional view illustrating a second embodiment of the invention with a variable throttling means.

FIG. 2 illustrates a second embodiment of the invention in which the throttling means between the first outlet 31 and the regulating chamber 35 is variable, differently constructed as compared with FIG. 1, and part of a pressure-responsive valve taking the place of pressure-responsive valve 41 in FIG. 1. Corresponding parts are indicated in FIGS. 1 and 2 by like reference numerals.

The pressure-responsive valve 60 has a valve cylinder bore 61 in which a control valve slide 62 is located in sealed condition. Control valve slide 62 is divided by two annular grooves 63, 64 into three piston portions 65, 66 and 67. At the end of cylinder 61, piston portion 67 forms a control chamber 69, and at the other end of cylinder 61, piston portion 65 forms a control chamber 68 in which a spring 72 is located which urges control valve slide 62 toward the right as viewed in FIG. 2 to the illustrated control position in which a flange of piston portion 65 interrupts the connection between control chamber 67 and the return outlet 71, while piston portion 67 forms a throttling means 70 between a duct 74 connected with the first outlet 31, and a conduit 73 connected with regulating chamber 35.

It is possible to construct the piston portions and control edges of the cylinder of the pressure-responsive control valve 60 in such a manner that throttling means 70 closes and interrupts the connection from outlet 31 to regulating chamber 35, after the piston portion 65 permits flow of fluid from regulating chamber 35 and conduit 75, cylinder 61, control chamber 68 and out of return outlet 71 into container 27 where it is sucked up by pump 27, not shown in FIG. 2. This construction may be described as "negative overlapping." It is also possible to provide "positive overlapping" so that during movement of control valve slide 62 to the left as viewed in FIG. 2, first the connection between outlet 31 to regulating chamber 35 through throttling means 70 is interrupted, before regulating chamber 35 is connected with the return outlet 71.

When "negative overlapping" is provided, the function of the apparatus shown in FIG. 2 corresponds substantially to the function of the apparatus shown in FIG. 1 Due to the fact that throttling means 70 formed by the control valve slide 62 is variable, and is changed during movement of control valve slide 62 to the control position connecting regulating chamber 35 with the return outlet 71, the advantage is obtained that during flow regulation by the regulating valve slide 13, the throttling means 70 is wide open and has the maximum throttling flow cross section, so that the movements of the regulating slide 13 are less dampened than in the construction of FIG. 1 in which throttling means 37 has a constant flow cross section. As a result, the fluid losses are smaller in the arrangement of FIG. 2 than in the arrangement of FIG. 1.

When slide 62 is in its first control position, the pressure fluid from inlet 25 is supplied at a constant amount to the first outlet 31, while the excess fluid is supplied to the second outlet 33. When the flow through outlet 31 is stopped, the pressure in the first outlet 31, and thereby the pressure in regulating chamber 35 exceeds the amount to which pressure-responsive control valve 60 was set, so that control slide 62 moves to the left as viewed in the drawing to a second control position against the action of spring 72. During this movement, the throttling cross section of throttling means 70 is reduced since piston portion 67 moves toward the control edge of valve cylinder 61. At the same time, a connection from regulating chamber 35 to return outlet 71 is gradually opened. Due to the "negative overlapping" of the functions of slide 62, the connection to the return outlet 71 is opened before throttling means 70 closes so that only a small loss flow from the first outlet 31 flows through the control valve means 60 into the return outlet 71 through conduit 74, annular space 64, control chamber 69, conduits 73 and 75, annular space 63, and control chamber 68. The pressure differential developing at throttling means 70 acts on regulating slide 13, which operates in the manner described with reference to the regulating valve of FIG. 1. The pressure differential acts in regulating chambers 35 and 39, and the higher pressure in regulating chamber 39 displaces regulating slide 13 against the force of spring 34 so that piston portion 21 interrupts the connection between inlet 25 and the first outlet 31, while piston portion 22 opens the connection from inlet 25 to conduit 32 and the outlet 33.

The pressure prevailing in outlet 33 may be greater or less than the pressure in outlet 31. Consequently, the apparatus of FIG. 2 obtains a better flow regulation, and a more efficient pressure regulation with fewer losses than the embodiment of FIG. 1.

When "positive overlapping," is selected, an even better efficiency can be obtained. As noted above, the movement of control slide 62 against the action of spring 72 can be arranged so that the throttling means 70 is closed before regulating chamber 35 is connected with the return outlet 71. In such an arrangement, the advantage as compared with negative overlapping is that there is no loss flow through pressure-responsive control valve 60. This is due to the fact that, when the pressure in outlet 31 rises above the pressure at which the pressure-responsive control valve 60 responds, the displacement of control slide 62 closes throttling means 70, so that duct 74 is closed, and the pressure in regulating chamber 35, which depends in turn on the pressure in the other regulating chamber 39, acts through conduit 73 on the control valve slide 62. By a short opening of pressure-responsive control valve 60 to connect regulating chamber 35 with return outlet 71, the pressure in regulating chamber 35 is reduced. The regulating slide 13 assumes, as explained above, such a position that the pressure required at the first outlet 31 is throttled due to the operation of the control valve 60. Due to the "positive overlapping" of control slide 62, no loss flow occurs into the return outlet 71, as long as the pressure in outlet 31, and the pressure in regulating chamber 35 less the pressure of spring 35, does not drop below the pressure at which pressure-responsive control valve 60 responds.

The principle of the invention may also be applied to regulating valves with a hollow slide in which the throttling means is provided on the regulating slide or spaced from the same in the valve body. Instead of providing negative or positive overlapping, as explained above, "zero overlapping" can be adjusted in which throttling means 70 closes at the same moment in which regulating chamber 35 is connected by piston portion 65 and control chamber 68 to the return outlet 71. This arrangement, however, has a somewhat greater danger of development of fluid oscillations.

It will be understood that each of the elements described above, or two or more together, may also find a useful application in other types of throttling arrangements for regulating valves differing from the types described above.

While the invention has been illustrated and described as embodied in a throttling arrangement for controlling the flow from two outlets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Throttling arrangement for controlling the flow from two outlets, comprising supply means for a pressure fluid; flow-regulating valve means having an inlet receiving pressure fluid from said supply means, first and second outlets, a first regulating chamber, biasing means in said first regulating chamber for urging said regulating valve means in one direction to a first regulating position connecting said inlet with said first and second outlets, and a second regulating chamber communicating with said first outlet and receiving fluid therefrom for urging said regulating valve means in the opposite direction to a second regulating position connecting only said second outlet with said inlet; and control means including return outlet means communicating with said supply means for returning fluid to the same, throttling means between said first outlet and said first regulating chamber, and a pressure-responsive valve means between said first regulating chamber and said return outlet means, and being biased to a first control position disconnecting said first regulating chamber from said return outlet means so that fluid from said first outlet produces pressure in said first regulating chamber through said throttling means whereby said regulating valve means is held in said first regulating position, said pressure-responsive valve means being moved to a second control position when the pressure in said first outlet and said first regulating chamber exceeds a predetermined value, said pressure-responsive valve means in said second control position connecting said first regulating chamber with said return outlet means so that the pressure fluid in said second regulating chamber moves said regulating valve means to said second regulating position, said biased pressure-responsive valve means returning to said first control position when the pressure in said first outlet and thereby in said first regulating chamber drops so that said first regulating chamber is disconnected from said return outlet means and the pressure therein increases so that said regulating valve means is moved to said first regulating position.

2. Throttling arrangement as claimed in claim 1 wherein said throttling means is variable.

3. Throttling arrangement as claimed in claim 2 wherein said throttling means is connected with said pressure-responsive valve means for movement therewith so that the throttling flow cross section of said throttling means is reduced when the free flow cross section of said pressure-responsive valve means between said first regulating chambers and said return outlet means increases during movement of the same from said first to said second control position.

4. Throttling arrangement as claimed in claim 1 comprising another pressure-responsive valve connecting said second outlet with said return outlet means when the pressure in said second outlet exceeds a preselected pressure.

5. Throttling arrangement as claimed in claim 1 wherein said pressure-responsive valve includes a seat communicating with said first regulating chamber, a check valve member on said seat, and a spring biasing said check valve member against said seat; and wherein said check valve member moves away from said seat when the pressure in said first regulating chamber exceeds said predetermined value.

6. Throttling arrangement as claimed in claim 1 comprising conduit means connecting said first outlet with said first regulating chamber; and wherein said throttling means is a constricted portion of said conduit means.

7. Throttling arrangement as claimed in claim 1 wherein said control means include a control valve cylinder having a control inlet connected with said first outlet, a return outlet constituting said return outlet means, and connecting conduit means between said control valve cylinder and said first regulating chamber; wherein said pressure-responsive valve means include a control valve slide located in said cylinder and forming in the same a first control chamber communicating with said first outlet and said connecting conduit means, and a second control chamber communicating with said return outlet, and also include biasing means in said second control chamber for urging said control valve slide to said first control position; wherein said control valve slide is moved to said second control position when the pressure in said first control chamber increases with the pressure in said first outlet; and wherein said control valve slide forms said throttle means in said control valve cylinder so that the throttling flow cross section of said throttle means varies during movement of said control valve slide between said first and second control positions.

8. Throttling arrangement as claimed in claim 7 wherein said control valve slide fully opens said throttling flow cross section in said first control position, and closes said throttling flow cross section in said second control position.

9. Throttling arrangement as claimed in claim 8 wherein said control valve slide and said control valve cylinder have portions cooperating during movement of said control valve slide to said second control position for first connecting said connecting conduit means and first regulating chamber with said return outlet and for then closing said throttling flow cross section.

10. Throttling arrangement as claimed in claim 8 wherein said control valve slide and said control valve cylinders have portions cooperating during movement of said control valve slide to said second control position for first closing said throttling flow cross section and for then connecting said connecting conduit means and first regulating chamber with said return outlet.

* * * * *